United States Patent [19]
Webb

[11] Patent Number: 6,031,052
[45] Date of Patent: Feb. 29, 2000

[54] DICHROMATE OXIDATION OF POLYBUTADIENE: FORMATION OF A HYDROXYLATED POLYALKYL HOMOPOLYER

[76] Inventor: Tim Webb, 905 Park Pl., Rogers, Ark. 72758

[21] Appl. No.: 08/517,104

[22] Filed: Aug. 21, 1995

[51] Int. Cl.⁷ ...................................................... C08F 8/06
[52] U.S. Cl. ................... 525/279; 525/332.8; 525/332.9; 525/333.2; 525/360; 525/375
[58] Field of Search ..................................... 525/279, 360, 525/375, 332.8, 332.4, 333.2

[56] References Cited

U.S. PATENT DOCUMENTS

| | | | |
|---|---|---|---|
| 4,052,370 | 10/1977 | Halasa et al. | 525/333.2 |
| 5,070,150 | 12/1991 | Hopper | 525/333.2 |

*Primary Examiner*—Bernard Lipman

[57] ABSTRACT

A process of hydroxylation of polybutadiene using hydroxy terminated polybutadiene and reacting it with tetraethyl ammonium chloride, potassium dichromate and pyridine. The polymer product is subsequently washed with hydrochloric acid and water to produce a polybutadiene with both terminal and internal hydroxylation.

2 Claims, No Drawings

DICHROMATE OXIDATION OF POLYBUTADIENE: FORMATION OF A HYDROXYLATED POLYALKYL HOMOPOLYER

BACKGROUND OF INVENTION

The present invention relates to the process by which polybutadiene's (hydroxy-terminated) double bonds are transformed by the reaction of potassium dichromate to alcohol moieties. The process includes the use of (1) hydoxy terminated polybutadiiene solvated by pyridine (a modifier of the reaction)/methylene chloride, tetraethyl ammounium chloride, potassium dichromate; (2) wash in dilute hydrocloric acid to protonate the hydroxyl units and to form the eschenmoser salt, (3) wash in water to remove the salts.

DESCRIPTION OF THE PRIOR WORK

In *Tetrahedron Letters* Volume 21, pp 177–180 Pergamon Press, Limited, 1980 (Great Britian) 'Homogeneous Permanganate Oxidation in Non-Aqueous Organic Solution. A Stable Organomanganese Intermediate in the Oxidation of Endo-Dicyclopentadiene' by Toshio Ogino describes the formation of two products from the permanaganate oxidation of endo-dicyclopentadiene an aldehyde and a diol, and he eludes to the formation of the diol as being mediated by a basic solution.

SUMMARY OF INVENTION

The purpose of this process is to transform the double bonds of polybutadiene and its derivatives to diol moieties at room temperature under cost effective terms to obtain an optimal yield.

BRIEF DESCRIPTION OF THE EXPERIMENTAL PROCESS

A polybutadiene derivative is solvated in methylene chloride modified by tetraethyl ammonium chloride. Then potassium dichromate is added with pyridine and allowed to react. Then after a period dilute hydrochloric acid is added for washing then decanted. Then water is added to wash the hydroxylated homopolymer of salts.

DETAILED DESCRIPTION OF THE EXPERIMENTAL PROCESS 2,808 grams of hydroxy-polybutadiene was added to a vial and allowed to sit. 0.237 grams of tetraethyl ammonium chloride hyrdated and 0.082 grams of potassium dichromate, 3.0 ml of pyridine and 10 ml of methylene chloride were added to a separate vial and allowed to solubilize overnight. Then the contents of the two vials were mixed together and allowed to react throughly for nine days at room temperature. A portion of the mother liquor was taken into a vial and 1.50 ml of 0.500 N hydrochloric acid was used to wash the polymer forming a light blue complex—the eschenmoser salt—. The homopolymer and eschenmoser salt were washed in water until the blue precipitate no longer existed. The sample was sent for infrared analysis—See Chart 1 analysis results peak centered at 3400 reciprocal centimeters, strong, O—H strecth; 2940 reciprocal centimeters C—H strecth, 2860 reciprocal centimeters C—H strecth, 1596.35 reciprocal centimeters pyridine containment of mother liqour; 1038.22 vs multiplet —OH in plane deformation indicating primary and secondary alcohols. Mechanical test: a small aliquot of the washed homopolymer was mixed with a equal amount of store bought epxoy hardener, the mixture harderened to a pliable but firm material. The homopolymer is insoluble in a potassium ethoxide/ethanol/water mixture, ethyl carbamate, where it forms films, and water (forms films).

I claim:

1. A process for forming a unique hydroxylated homopolymer of hydroxy-terminated polybutadiene or like polymer, comprising the steps of:

solvating a polybutadiene derivative in methylene chloride modified by tetraethyl ammonium chloride, adding potassium dichromate with pyridine and allowing it to react, adding after a period dilute hydrochloric acid for washing, decanting, and washing with water to wash the hydroxylated homopolymer of salts.

2. A homopolymer suitable for use with epoxides forming a pliable but strong material formed by the process of claim 1.

* * * * *